(12) United States Patent
Hellenthal et al.

(10) Patent No.: US 7,426,737 B2
(45) Date of Patent: Sep. 16, 2008

(54) METHOD AND APPARATUS FOR OPERATING AN OPEN API NETWORK HAVING A PROXY

(75) Inventors: Jan Willem Hellenthal, Ermelo (NL); Franciscus Josephus Maria Panken, Bussum (NL)

(73) Assignee: Lucent Technologies Inc., Murray Hill, NJ (US)

(*) Notice: Subject to any disclaimer, the term of this patent is extended or adjusted under 35 U.S.C. 154(b) by 558 days.

(21) Appl. No.: 10/764,754

(22) Filed: Jan. 26, 2004

(65) Prior Publication Data

US 2005/0165902 A1 Jul. 28, 2005

(51) Int. Cl.
G06F 9/44 (2006.01)

(52) U.S. Cl. ...................... 719/328; 709/217

(58) Field of Classification Search ............... 719/310, 719/318, 320, 328, 330; 709/217, 219, 224, 709/226, 203; 370/465, 469; 379/201.03
See application file for complete search history.

(56) References Cited

U.S. PATENT DOCUMENTS

| | | | |
|---|---|---|---|
| 6,405,250 B1 | 6/2002 | Lin et al. | |
| 6,415,275 B1 * | 7/2002 | Zahn | 706/47 |
| 6,438,594 B1 * | 8/2002 | Bowman-Amuah | 709/225 |
| 6,457,066 B1 * | 9/2002 | Mein et al. | 719/330 |
| 6,621,895 B1 * | 9/2003 | Giese | 379/201.03 |
| 6,728,267 B1 * | 4/2004 | Giese et al. | 370/469 |
| 6,728,884 B1 * | 4/2004 | Lim | 726/12 |
| 6,738,806 B1 * | 5/2004 | Maryka et al. | 709/220 |
| 6,782,542 B1 * | 8/2004 | Mein et al. | 719/330 |
| 6,842,906 B1 * | 1/2005 | Bowman-Amuah | 719/330 |
| 6,981,263 B1 * | 12/2005 | Zhang et al. | 719/310 |
| 7,082,463 B1 * | 7/2006 | Bradley et al. | 709/223 |
| 7,100,166 B2 * | 8/2006 | Takatama et al. | 719/318 |
| 7,103,644 B1 * | 9/2006 | Zhang et al. | 709/219 |
| 7,225,244 B2 * | 5/2007 | Reynolds et al. | 703/223 |
| 2002/0026473 A1 | 2/2002 | Gourraud | |
| 2002/0101879 A1 * | 8/2002 | Bouret et al. | 370/465 |
| 2003/0177281 A1 * | 9/2003 | McQuillan et al. | 709/320 |
| 2003/0225823 A1 | 12/2003 | Meeuwissen et al. | |

FOREIGN PATENT DOCUMENTS

| | | |
|---|---|---|
| EP | 05 25 0064 | 4/2005 |
| JP | 2003256223 | 9/2003 |
| WO | WO 03/017619 A | 2/2003 |

OTHER PUBLICATIONS

Boyer "An Open Service Platform and API for Networked Based Multimedia Bridges", 1996 IEEE, pp. 888-892.*

(Continued)

Primary Examiner—Van H Nguyen (57) ABSTRACT

A telecommunication system, method, apparatus, and computer readable media that implements an open application program interface (API) system in which open API servers pass and receive API commands to applications through a novel proxy. The proxy assists implementing various management functions, such as assigning open API servers to application and monitoring the overall system, and service contract control, all beneficially in a transparent manner. The proxy enables the telecommunication system to handle geographically diverse applications and open API servers. All API command can, but need not, pass through the proxy.

8 Claims, 8 Drawing Sheets

OTHER PUBLICATIONS

Zoric et al. "Third Party Access to PSTN by Using APIs Experiences from Demo Development", 2000 IEEE.*

Venieris et al. "Enhancing Parlay with Mobile Code Technologies", 2001 IEEE, pp. 287-299.*

Wei Wu et al: "Design OSA/parlay application frameworks using a pattern language" Communication Technology Proceedings, 2003, ICCT 2003. International Conference on Apr. 9-11, 2003, Piscataway, NJ, USA, IEEE.

* cited by examiner

METHOD AND APPARATUS FOR OPERATING AN OPEN API NETWORK HAVING A PROXY

FIELD OF THE INVENTION

Embodiments of the present invention relate to telecommunication networks. More specifically embodiments of the present invention relate to telecommunication networks that support open API resources.

DESCRIPTION OF THE BACKGROUND ART

Telecommunication network operators are often reluctant to open their networks to new companies that offer communication-based applications. Their reluctance is at least somewhat justified in that network operators risk cannibalizing their own applications, particularly if price becomes the major difference between their applications and those offered by new companies. In fact, telecommunication network operators risk becoming mere 'transporters of bits' if they cannot compete with applications offered by new companies having low overhead costs.

Additionally, if telecommunication network operators open their networks to new applications and companies, network operators facing losing control of their networks by having to support network demands driven by applications written and maintained by 3rd parties, such as service providers or software vendors.

While the reluctance to open their networks may be justified, if telecommunication network operators do not do so they risk losing lucrative markets that new companies and applications might create. Since most new companies operate outside of the traditional telecommunication network boundaries, new applications may create entirely new services that bring in customers that normally would not use the network. Additionally, government mandated forces that seek to increase telecom market competition can force network operators to open their networks.

In one scenario, transactions between a network and applications are beneficially based on a set of interfaces and data types that form Application Programming Interfaces (APIs). If those APIs are standardized and widely available for use, such APIs are referred to as open APIs. Open APIs are typically established by software organizations that both carefully define the APIs and promulgate their use. Many sets of open APIs exist, for example the Parlay/OSA APIs, which were originally defined within the Parlay group and standardized in the context of 3GPP and ETSI. The Parlay/OSA APIs (where OSA stands for Open Service Architecture) form a set of nine orthogonal Service Capability Functions (SCFs), each of which address a different telecom area: call control, user interaction, mobility, terminal capabilities, data session control, generic messaging, connectivity management, presence/availability, and charging.

Thus, a prior art API-based system includes a set of open APIs, a set of users that send and receive information via servers, a telecommunication network that transports the information, and 3rd party-owned applications that receive information through the open APIs, runs an application based on those APIs, and sends responding information back to the network through the open APIs.

While useful, prior art API based systems are subject to significant limitations. First, in prior art API-based systems there is a one-to-one relationship between open API servers and applications. To overcome this limitation, prior art API based systems have included a Registration and Discovery entity that is used by the Open API servers to announce themselves and used by the applications to discover what APIs are available. When there are multiple Registration and Discovery entities, a fundamental problem is what registration and discovery entity an Open API server should use. To avoid that problem an Open API server could announce itself to all of the available Registration and Discovery entities. But, that creates a problem since to assign an open API server to multiple registration and discovery entities, the configuration of the overall system must be known, and that is difficult to determine.

Another problem in prior art API based systems is after an application discovers what open API server to use for its services, that relationship is static. While the initial open API server might have been beneficial at a certain moment in time, a subsequent occurrence, such as an Open API server failure, could create huge problems. In that case, the application providing a certain service could no longer be used without a recovery session that was initiated by the application. Yet another problem in prior art open API systems is the difficulty of enforcing Service Level Agreements.

In view of the foregoing (and other) limitations, a new open API-based system has been proposed. That system includes open applications and open API servers, but the telecommunications network inserts a proxy device between the open applications and the open API servers. That proxy can handle start-up to avoid overlap, determine which open API server (or servers) will handle a particular API event or method invocation, balance communication loads between the various open applications and open API servers, and dispatch events between the open applications and open API servers.

While the proxy is a promising addition to open API-based systems, the proposed proxy fails to address other foreseeable problems in successful systems. Therefore, a proxy that addresses other problems in open API-based system would be beneficial. Also beneficial would be a telecommunication network having a proxy that addresses other problems of open API-based system. In addition, a method of operating a proxy that addresses other problems of open API-based system would be beneficial. A computer readable media that stores a computer program that operates a proxy that addresses other problems of open API-based system would also be beneficial.

SUMMARY OF THE INVENTION

The disadvantages heretofore associated with the prior art are addressed by a novel method for operating a telecommunication network in a way that addresses limitations of open API-based systems.

The disadvantages heretofore associated with the prior art are addressed by a novel proxy, and a telecommunication network having such a proxy, that addresses limitations of open API-based systems.

The disadvantages heretofore associated with the prior art are addressed by a computer readable media that stores a computer program that operates a proxy, and thus a telecommunication network, such that limitations of open API-based systems are addressed.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention is directed to novel open API-based methods, apparatus, computer readable media, and systems that incorporate a proxy between applications and open API servers. Open API systems in accord with the present invention can handle two types of information flows, those that originate in the network and are forwarded to the application and those that flows from the applications to the network. Although both flows are communicated through the APIs, in what follows the first type is referred as an event and the second is referred to a method invocation.

Figure 1:
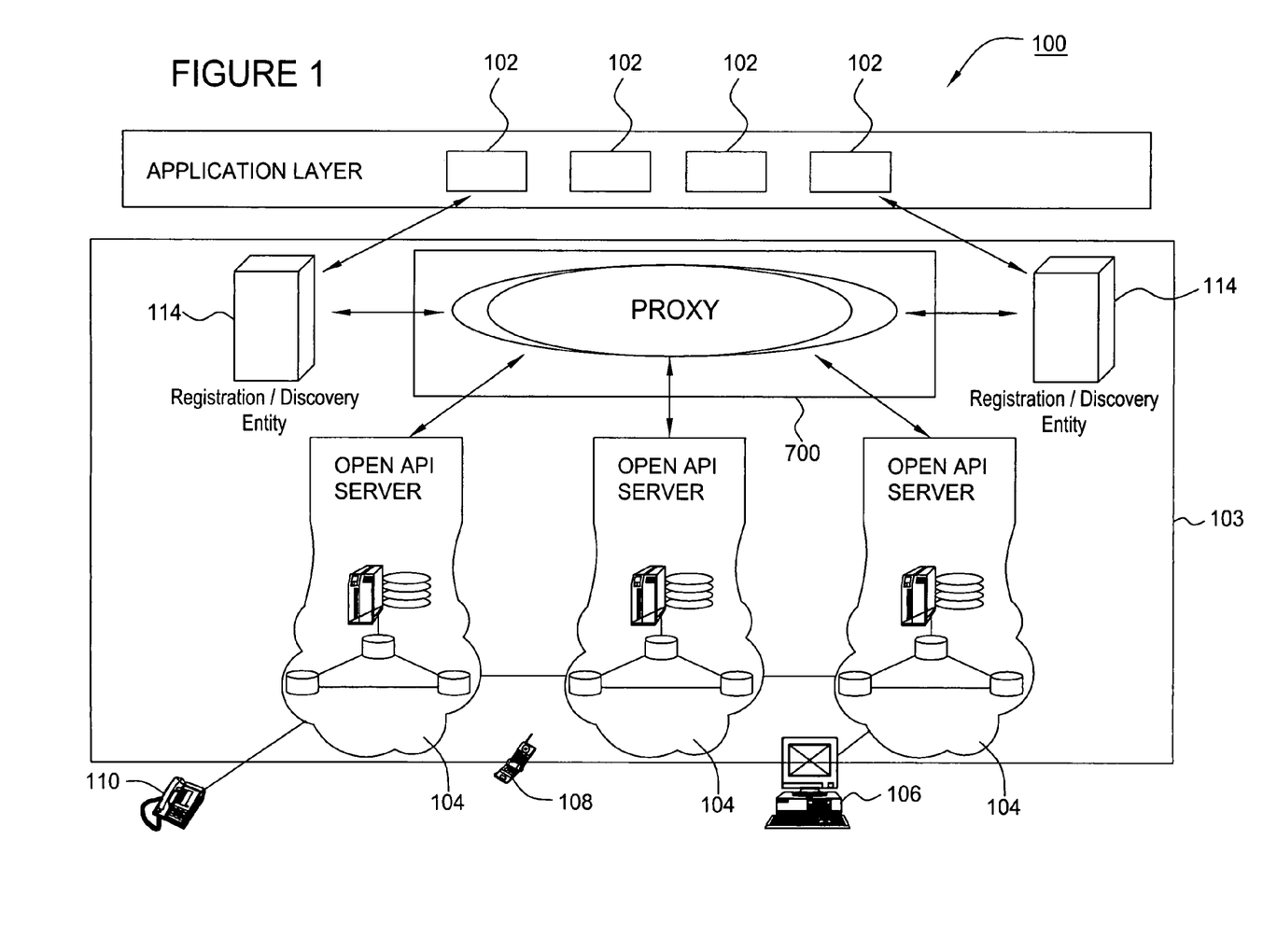
FIG. 1 depicts an overview of an API-based system that is in accord with the principles of the present invention.

FIG. 1 illustrates an open API-based system 100 that is in accord with the principles of the present invention. That system 100 includes applications 102 and open API servers 104 that pass information via open Application Programming Interfaces. The application 102 can be a program(s), enterprise application type systems, or other resource that operates using APIs accessing network resources. The open API servers 104 are communication nodes connected to any of a wide range of user devices, such as computers 106, hand sets 108, or telephone systems 110. Consequently, user devices should be understood as being any device that seeks to run an application 102. Services offered by an application 102 are implemented when one of the user devices contacts an open API server 104 that then passes information to the application 102 in a manner described subsequently.

As shown, between the open API servers 104 and the applications 102 is a proxy 700. The open API servers 104 and the proxy 700 could be part of a commonly owned network 103. Furthermore, while the applications 102 are shown at an application level, it is possible that one or more applications 102 are also owned or operated by the owner of the network 103. As is subsequently described in more detail, the proxy 700 transparently handles communications between the open API servers 104 and the applications 102. To that end, the applications 102 initially authenticate and subsequently register their presence with the proxy 700, which is accomplished by the applications 102 contacting a registration and discovery device 114 that receives—or can determine from an authentication mechanism—the registration information (such as IP addresses, start conditions, geographic locations, allowable APIs, etc) required by the proxy 700 to identify, accept, and use the application 102.

Registration of applications 102 primarily takes place when the applications 102 announce their start conditions. After an application 102 is authenticated, it can discover, select, and start using the services offered by the open API servers 104. By registration, the proxy 700 determines the capabilities of all open API servers 104 and subsequently combines those capabilities to form a superset of capabilities. The proxy 700 subsequently registers the superset capabilities with the registration and discovery device 114, making it possible for the registration and discovery device 114 to advertise a more generic set of services to authenticated applications 102 that are discovering services. This also offers the open API servers 104 the ability to register only at a single location, and also offers a central place for monitoring and maintaining the open API network, which is described in more detail subsequently.

Figure 2:
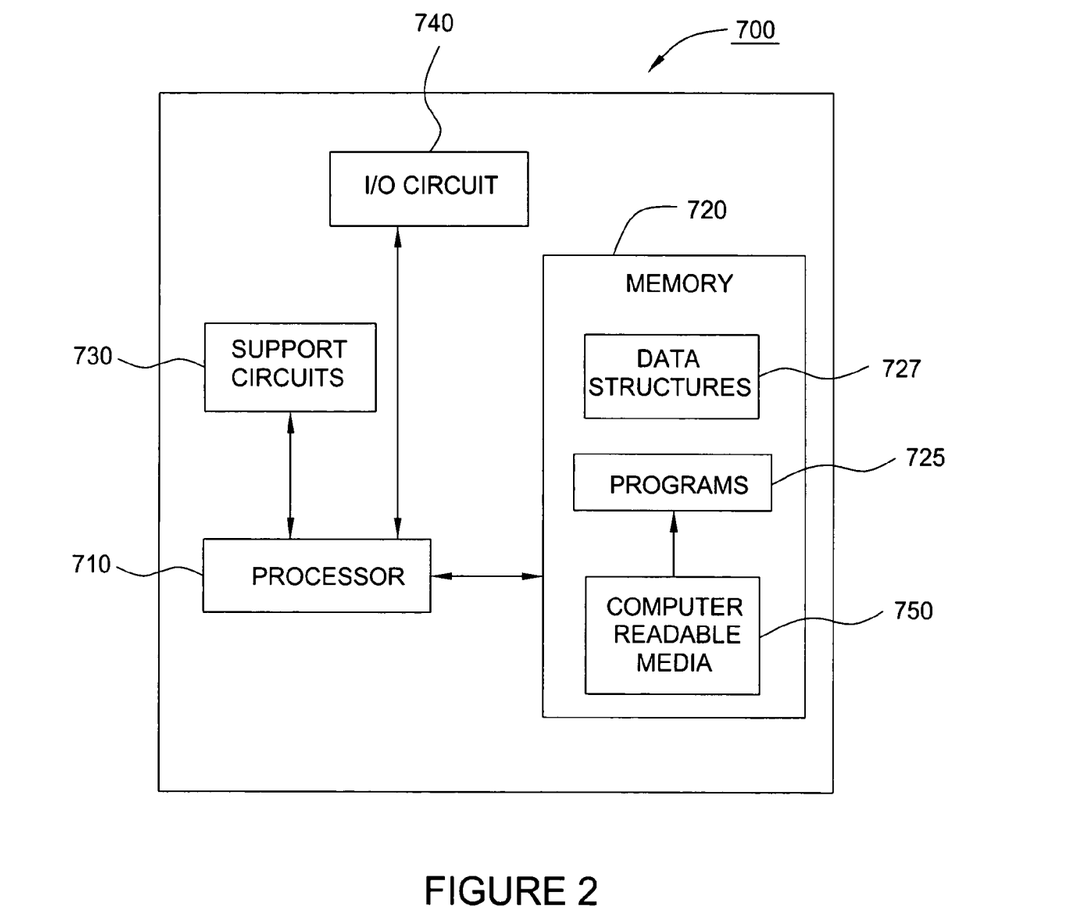
FIG. 2 depicts a general view of a proxy.

FIG. 2 illustrates a high level block diagram of an embodiment of a proxy 700. The proxy 700 comprises a processor 710 as well as a computer memory 720 for storing control programs 725 and data structures 727. The processor 710 cooperates with conventional support circuitry 730 such as power supplies, clock circuits, cache memory and the like, as well as circuits that assist in executing the software routines stored in the memory 720. As such, it is contemplated that some of the process steps discussed herein as software processes may be implemented within hardware, for example, as circuitry that co-operates with the processor 710 to perform various steps. The proxy 700 also contains input-output circuitry 740 that forms an interface to the overall telecommunication network, the applications 102, and the open API servers 104.

Although the proxy 700 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof. Furthermore, if implemented in software or firmware, the proxy 700 includes a computer readable media 750 that stores information that can be run and/or accessed by the processor 710. Whether implemented in hardware or in software, or in a combination of hardware/software, the proxy 700 operates to fulfill the functions described below.

A first function fulfilled by the proxy 700 is in enforcing of service contracts between two or more of the open API servers 104, the users, the applications 102, and the telecommunication network operators. Examples of parameters that could be part of a service contract include the resource usage allowed by an open API server 104, e.g., the maximum number of calls, the maximum number of call legs allowed per call, the maximum number of mailboxes open, billing, time limitations, and APIs that are allowed. In some embodiments, the proxy 700 dynamically distributes service contracts to the open API servers 104.

Figure 3A:
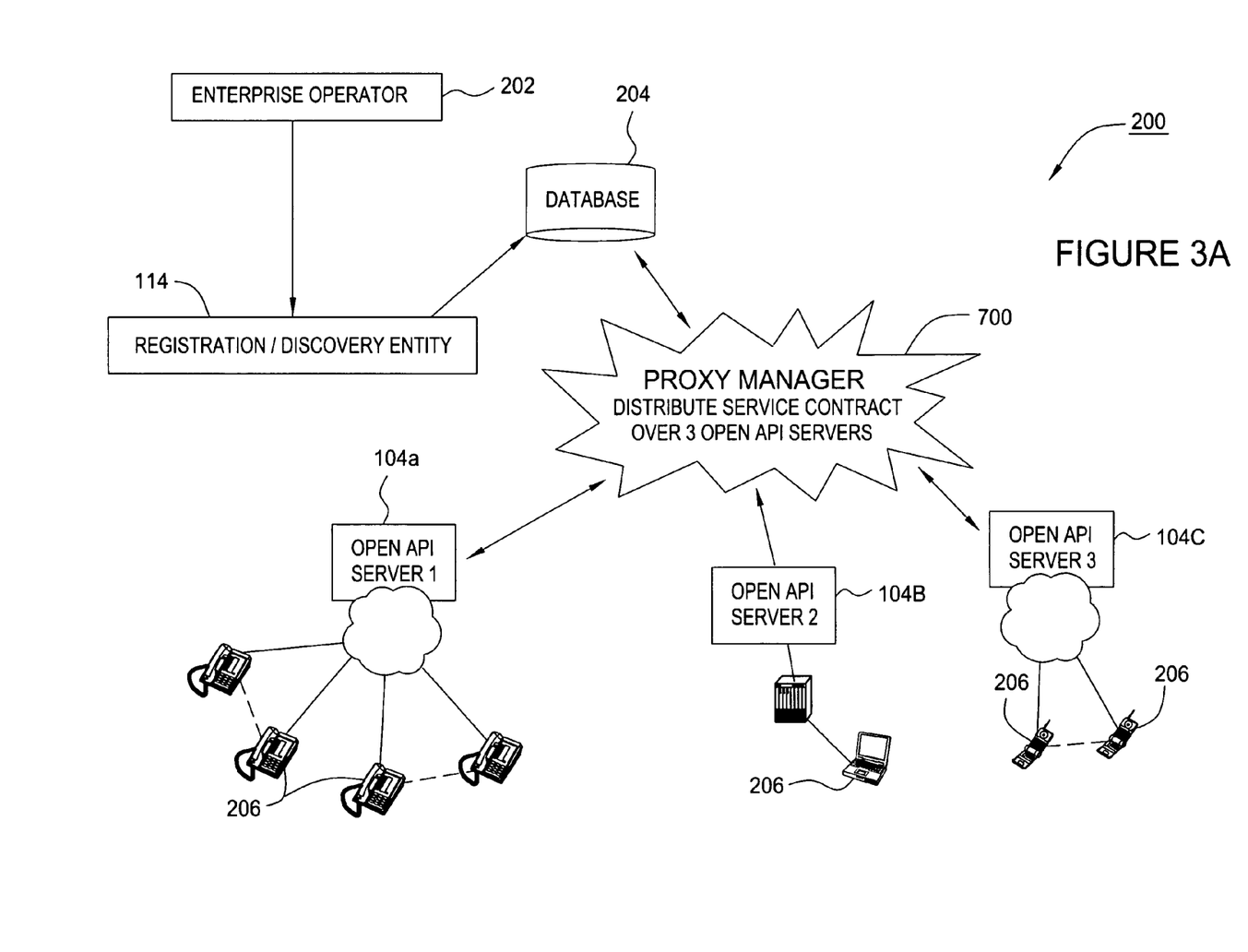
FIG. 3A illustrates a system for implementing service contract control.
Figure 3B:
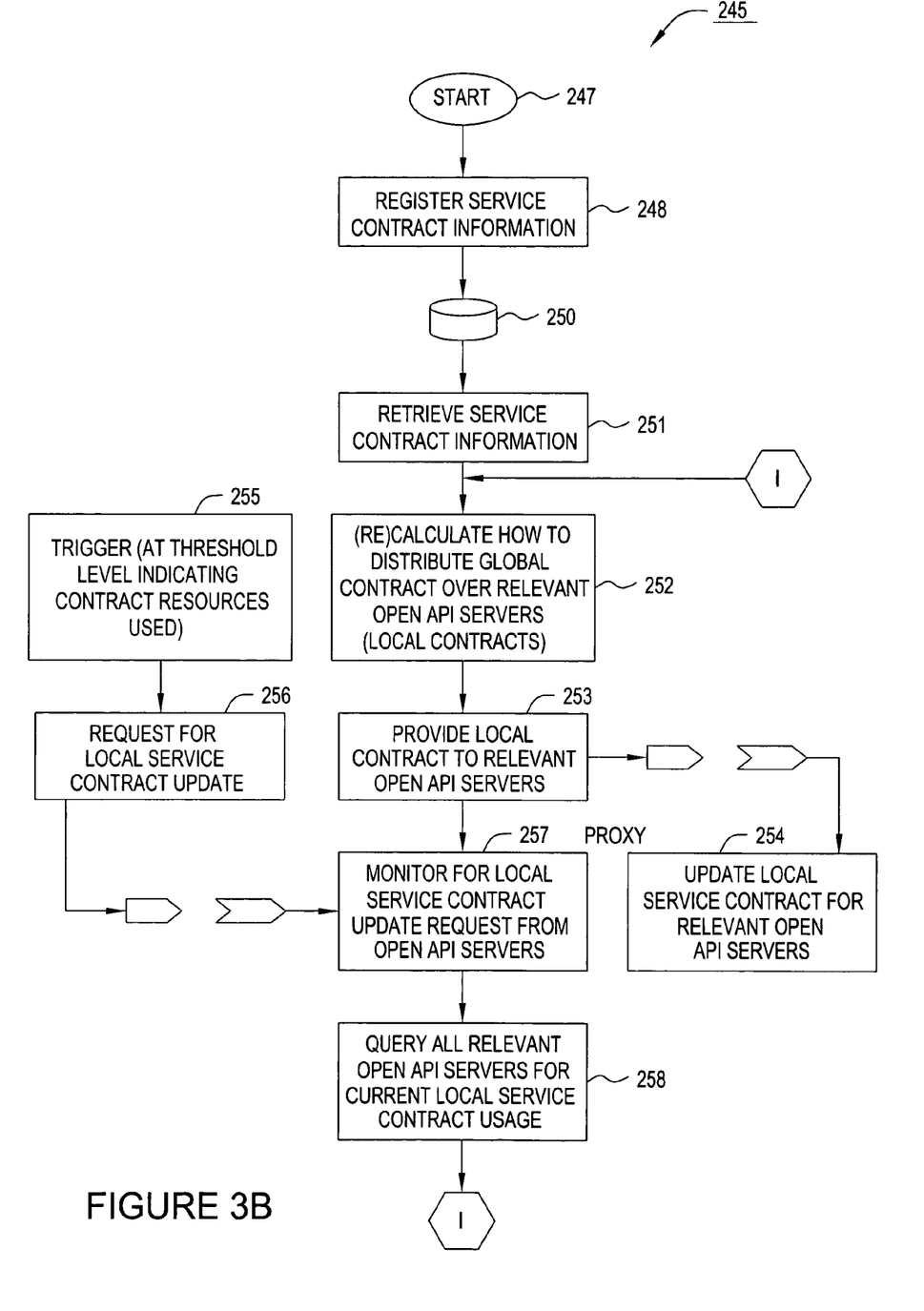
FIG. 3B illustrates a flow diagram of implementing service contract control.

FIG. 3A illustrates a system 200 for implementing service contract control via the proxy 700, while FIG. 3B illustrates a flow diagram of the operation of the system 200. The following makes reference to both of those figures. The system 200 includes a registration and discovery device 114 that operatively connects to an enterprise operator 202 and to the proxy 700 via a database 204. However, it should be understood that the database 204 is optional: some embodiments will not incorporate the database 204. Referring now to FIG. 3B, a method 245 of service contract control starts at step 247 and proceeds at step 248 by obtaining and registering service contract control information. To do so, the enterprise operator 202 provides the terms of a service contract as a set of control parameters to the registration and discovery device 114, which at step 250 stores the control parameters in the database 204. Next, at step 251, the proxy 700 retrieves the control parameter, and at step 252 calculates how to assign the global contract information as local contracts to the relevant open API severs 104 (those impacted by the terms of the service contract). Then, at step 253 the local contracts are sent to the open API servers 104 by the proxy 700 sending, at step 254, individual open API servers 104 their implementation parameters.

After the open API servers 104 have their implementation parameters, at step 255 a trigger may cause a local open API server 104 to determine that its local service contract is deficient. For example, if a local open API server 104 is restricted to 10 calls, when it is handling 8 calls that open API server 104 may set a trigger to indicate that it may need authorization to handle more than 10 calls. In that case, at step 256, the local open API server 104 sends a request to the proxy 700 asking for a modification to its service contract. Meanwhile, at step 257, the proxy 700 has been monitoring the open API servers 104 to identify such requests. At step 258, after a request for a modification has been received, the proxy 700 at step 258 queries the relevant open API servers as to their current local usage. Once that usage has been determined, a loop is made back to step 252 for a re-calculation of relevant open API server's local contracts. Thus, the proxy 700 can allocate resources based on current usage while remaining within the service contract.

It should be understood that each entity may react to service contract terms differently. For example, the service contract for the open API server 104c may specify that no time critical information is to pass to or from the open API server 104c. Consequently, the proxy 700 can give APIs for the other open API servers 104a and 104b a higher priority.

After the entities have been provided with implementation parameters, at step 255 the various entities implement their portions of the contract terms. If the open API server 104 determines that it's local service contract for a particular set of applications requires an update, this open API server 104 can interrogate the proxy, requesting an update of the contract, in method 256. If the service contract for the set of applications stops, the method then stops at step 257. For example, when a user contacts an open API server 104, that server searches its service contract parameters and determines whether it can handle the particular call or service required by the user 206. For example, if the open API server 104a has a maximum number of calls, all calls in excess of that number may be refused or redirected to another open API server 104.

As the open API model becomes more popular, the number of open API entities will increase. This will introduce management and integration problems into the model. This presents a particular challenge since an open API system may consist of various entities that reside in highly diverse geographical locations. Since open API entity behavior has to be monitored to ensure system-wide compliance, and, if needed, appropriate corrective actions must be taken, diverse geographical locations present problems. Corrective action is a major concern because system-wide changes in a large network can be extremely difficult, time-consuming, and expensive. The proxy 700 provides an effective solution to such issues. Furthermore, the proxy 700 can do so in a transparent manner.

Figure 4A:
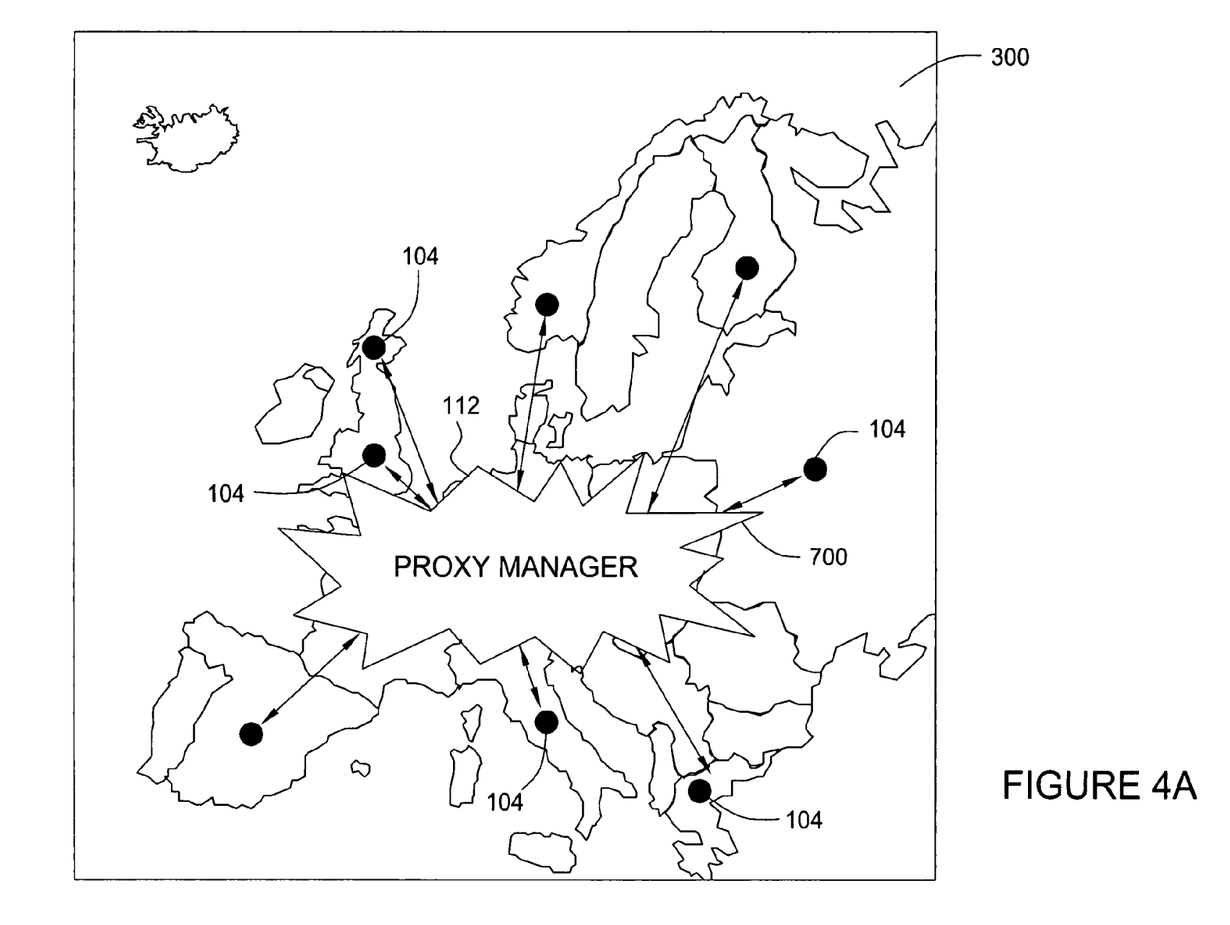
FIG. 4A illustrates a geographically distributed open API-base system.

FIG. 4A illustrates a geographic map of Europe in which various open API servers 104 are distributed throughout the continent. All of those open API servers are managed by the same proxy 700. It should be understood that the proxy 700 does not have to be a single entity, but may be comprised of a network of interconnected devices, systems, and networks that cooperatively form the proxy 700. Centrally managing that proxy 700 is greatly simplifies system wide changes since those changes can be promulgated by the proxy 700.

Figure 4B:
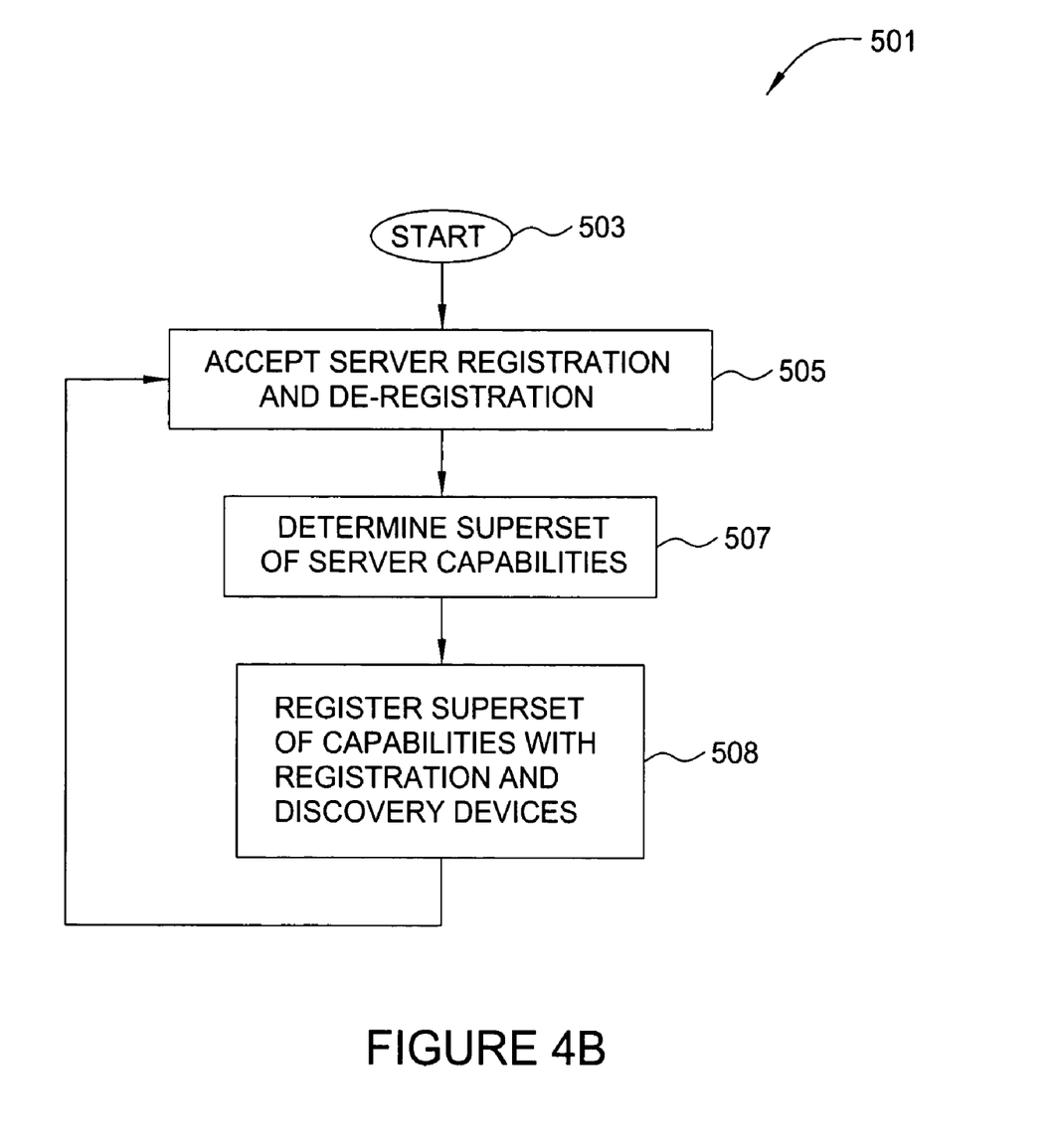
FIG. 4B illustrates registering open API entities.

FIG. 4B illustrates how the proxy 700 becoming the central entity. At step 505, the proxy 700 accepts registrations and de-registrations from the open API servers 104. At step 507, the proxy 700 determines the service capabilities of all of the open API servers 104, and then determines a superset of those capabilities. The proxy 700 subsequently registers this superset with all known registration and discovery devices 114. By acting as a central registration point, the proxy 700 becomes aware of the status of all open API servers 104, registration and discovery devices 114, and applications in the open API network. This enables the proxy 700 to act as the manager and integrator of the overall system.

Figure 4C:
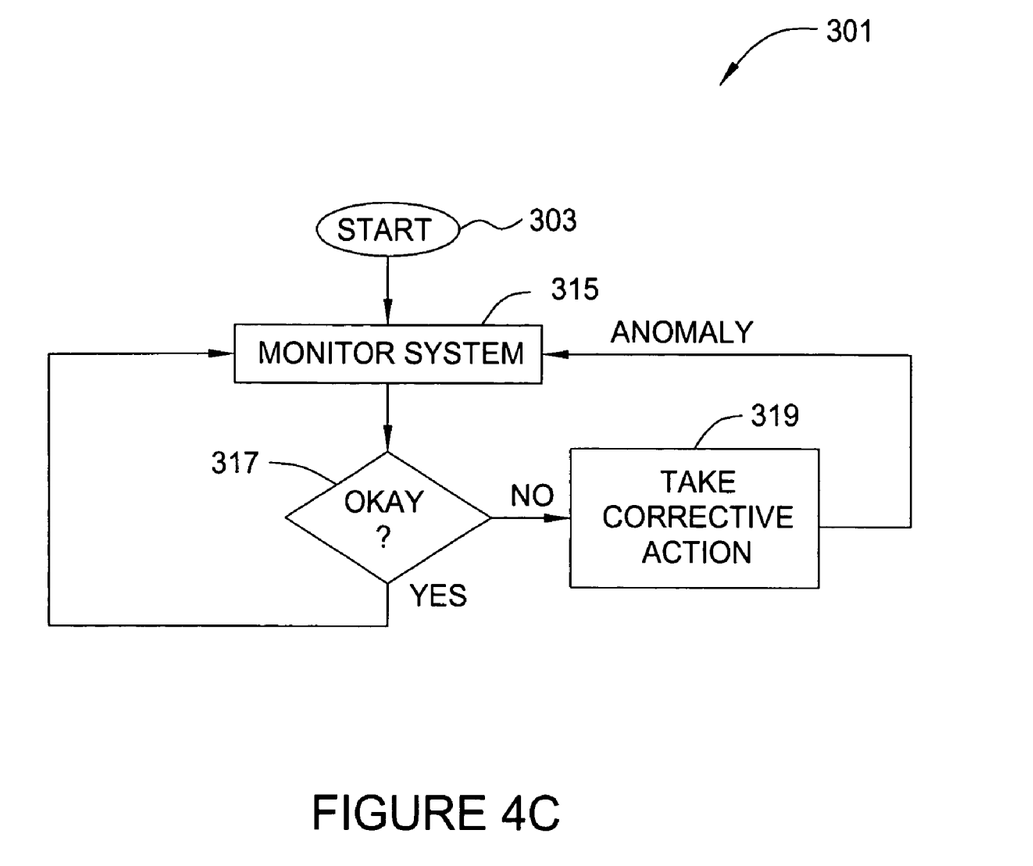
FIG. 4C illustrates a proxy monitoring an open API system.

FIG. 4C illustrates one method 301 of how the proxy 700 can manage and integrate the system. As shown, the method 301 starts at step 303 and proceeds at step 315 by monitoring the operation of the complete open API system. At step 317, if the open API system 200 is determined to be functioning correctly, the method returns to step 315, thereby continuing to monitor the overall operation. However, if at step 317 an anomaly is detected, the proxy 700 proceeds to step 319 where appropriate corrective action is taken. Appropriate actions can include re-starting a registration and discovery device 114, informing applications 102 of problems detected in the network, and/or re-assigning start conditions to open API servers 104 when they become active again. Note that informing the applications 102 of anomalies could be delayed or not executed if the proxy finds alternative open API servers 104 to guarantee the integrity of the open API system 200.

One important corrective action that the proxy can take is to act as a firewall to prevent inappropriate or dangerous APIs from propagating through the open API system. This becomes especially valid if a registration and discovery device 114 operates within the domain of a foreign network operator that wants to open its network resources for third parties that could develop APIs that could cause localized or system-wide breakdowns. Having the proxy 700 act as a filter to block such APIs is particularly beneficial.

As discussed above, the proxy 700 is aware of the other open API system entities and can directly assign a specific open API server 104 to a specific application 102, not only initially, but dynamically. Assignments can be changed to reflect network conditions, such as additions of applications 102 and open API servers 104, or as a result of system failures. This dynamic assignment capability significantly increases network availability.

Figure 5:
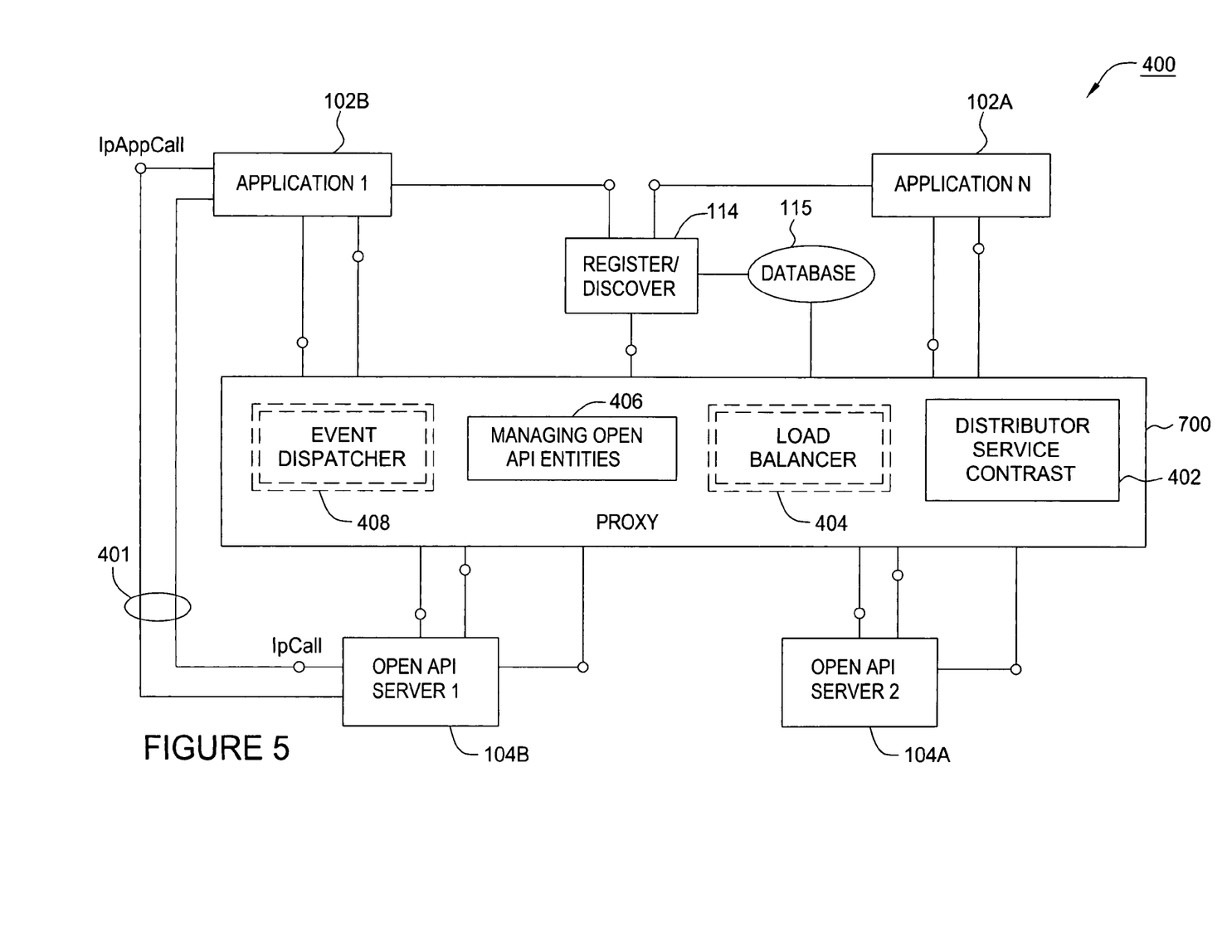
FIG. 5 illustrates an alternative API-based system that is in accord with the principles of the present invention.

While the foregoing may suggest that all communications between the applications 102 and the open API servers 104 pass through the proxy 700, such is not required. FIG. 5 illustrates an open API system 400 in which certain API calls by pass the proxy 700 and run directly between open API server 104b and application 102b. As shown, a specific call, designated IpCall, is communicated directly on lines 401. However, other API calls are handled by the proxy 700. Direct routing can prevent the proxy 700 from acting as a performance bottleneck.

FIG. 5 also illustrates software (or hardware) processes performed by the proxy 700. Such includes service contract software 402 that handles the previously described service contracts, load-balancing software 404 that balances communication loads between the open API servers 104 and the various applications 102, management software 406 that manages the open API entities as previously described, and an event dispatcher 408 that controls the dispatch of the various API calls between the open API servers 104 and the applications. For completeness, FIG. 5 also shows the registration and discovery device 114 and the database 204.

If properly configured, the proxy 700 is transparent: an open API server 104 need not know that it is communicating through the proxy 700, and an application 102, need not know it is communication through the proxy 700, except possibly while initially registering. The proxy 700 can provide proper start-up conditions, decide which competing application receives an event if several applications are available (act as a traffic cop), introduce delays in forwarding events to avoid potential problems, provide central management functions, implement service contracts, hide the network, choose to relay outstanding or new requests to other resources (thus increasing network availability), act as a firewall to maintain the integrity of the system, gather information from multiple resources and distribute the information as required and/or at the right time, ease system-wide changes and their integration, and centrally monitor applications 102 and open API servers 104.

While the foregoing is directed to embodiments of the present invention, other and further embodiments of the invention may be devised without departing from the basic scope thereof, and the scope thereof is determined by the claims that follow.

We claim:

1. An apparatus, comprising:
a plurality of open API servers adapted for communicating with a plurality of user devices and for sending and receiving application programming interface commands; and
a proxy comprising a processor and a memory, said proxy adapted for receiving said application programming interface commands from said open API servers, for sending said application programming interface commands received from said open API servers to an application, for receiving responses from said application, and for sending said received responses to said open API servers;
wherein said proxy processes service contract terms to determine local service contract implementation parameters for each of the open API servers and sends the local service contract implementation parameters to the respective open API servers, wherein the local service contract implementation parameters sent to the open API servers direct the open API servers to implement local service contract terms;
wherein each of said open API servers controls sending application programming interface commands based on the respective local service contract implementation parameters sent to the open API servers.

2. The apparatus of claim 1, wherein said service contract terms and said local service contract implementation parameters are related to a service contract.

3. The apparatus of claim 1, further including a database for storing control parameters, wherein said proxy accesses and processes said stored control parameters to form said local service contract implementation parameters.

4. The apparatus of claim 1, further including a registration and discovery device that receives control parameters, wherein said proxy processes said stored control parameters to form said local service contract implementation parameters.

5. The apparatus of claim 1, further including a computer readable media for storing program information that at least partially controls said proxy to produce said local service contract implementation parameters.

6. The apparatus of claim 1, wherein each of said open API servers is adapted for requesting modified local service contract implementation parameters based on service usage.

7. A method of operating a telecommunication network, comprising:
obtaining service contract terms by a proxy, wherein said proxy includes a processor and a memory;
storing the obtained service contract terms in said memory;
processing the service contract terms to determine local service contract implementation parameters for each of a plurality of open API servers;
sending said local service contract implementation parameters to said respective open API servers, wherein the respective local service contract implementation parameters sent to the open API servers direct the open API servers to implement local service contract terms;
receiving application programming interface commands from the open API servers, wherein each open API server sends said application programming interface commands based on the respective local service contract implementation parameters sent to the open API servers;
passing said received application programming interface commands received from said open API servers to at least one application;
receiving responses from said application; and
sending said received responses to said open API servers.

8. The method of claim 7, further including the steps of:
identifying, at said one of said open API servers, a condition requiring modification of at least one of said local service contract terms associated with said one of said open API servers; and
sending said at least one request to modify said at least one of said local service contract terms.

* * * * *